United States Patent
Bertino-Ghera et al.

(10) Patent No.: US 11,091,705 B2
(45) Date of Patent: Aug. 17, 2021

(54) PROCESS FOR THE PRODUCTION OF AROMATICS WITH EXTRACTION BEFORE AROMATIZATION

(71) Applicant: IFP Energies Nouvelles, Rueil-Malmaison (FR)

(72) Inventors: Celine Bertino-Ghera, Corbas (FR); Alexandre Pagot, St Genis Laval (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 16/767,935

(22) PCT Filed: Nov. 16, 2018

(86) PCT No.: PCT/EP2018/081581
§ 371 (c)(1),
(2) Date: May 28, 2020

(87) PCT Pub. No.: WO2019/105766
PCT Pub. Date: Jun. 6, 2019

(65) Prior Publication Data
US 2020/0339892 A1    Oct. 29, 2020

(30) Foreign Application Priority Data
Nov. 29, 2017 (FR) ...................... 1761374

(51) Int. Cl.
*C10G 61/04* (2006.01)
*C10G 35/085* (2006.01)
*B01J 23/42* (2006.01)

(52) U.S. Cl.
CPC .............. *C10G 61/04* (2013.01); *B01J 23/42* (2013.01); *C10G 35/085* (2013.01);
(Continued)

(58) Field of Classification Search
CPC ................. C10G 61/04; C10G 35/085; C10G 2300/1096; C10G 2300/4006;
(Continued)

(56) References Cited

U.S. PATENT DOCUMENTS

| 2,859,173 A | 11/1958 | Hess et al. | |
| 5,980,731 A * | 11/1999 | Kao | C10G 35/095 208/134 |
| 2012/0277505 A1* | 11/2012 | Serban | C10G 35/06 585/302 |

FOREIGN PATENT DOCUMENTS

FR    2925065 A1    6/2009

OTHER PUBLICATIONS

International Search Report dated Jan. 21, 2019 issued in corresponding PCT/EP2018/081581 application (2 pages).

* cited by examiner

*Primary Examiner* — Randy Boyer
*Assistant Examiner* — Juan C Valencia
(74) *Attorney, Agent, or Firm* — Millen White Zelano and Branigan, PC; Csaba Henter

(57) ABSTRACT

Process for the production of C6-C7 aromatic compounds from a hydrocarbon feedstock of naphtha type comprising the following stages:
a) the said feedstock (1) is sent into a first fractionation unit (2) in order to obtain an upper stream (3) comprising C6 and C7 hydrocarbon compounds and a lower stream (4) comprising C8 to C10 hydrocarbon compounds;
b) the upper stream (3) and a stream (12) comprising C6 and C7 aromatic compounds obtained on conclusion of stage e) are sent into a unit for extraction of the aromatics (5) in order to obtain an aromatic base (6) and a liquid effluent (7);
c) the liquid effluent (7) is sent into a first catalytic reforming unit (8) in order to obtain a first reformate effluent (9);
(Continued)

d) the said first reformate effluent (9) is sent into a reformate separation section (10) in order to obtain a first stream (11) comprising C5 hydrocarbon compounds and a second stream (12) comprising C6 and C7 aromatic compounds;

e) the second stream (12) comprising C6 and C7 aromatic compounds is recycled in stage b).

17 Claims, 2 Drawing Sheets

(52) U.S. Cl.
CPC ............... *C10G 2300/1096* (2013.01); *C10G 2300/4006* (2013.01); *C10G 2300/4012* (2013.01); *C10G 2300/4081* (2013.01); *C10G 2400/30* (2013.01)

(58) Field of Classification Search
CPC .... C10G 2300/4012; C10G 2300/4081; C10G 2400/30; C10G 61/02; C10G 2300/104; C10G 2300/1044; B01J 23/42
See application file for complete search history.

PROCESS FOR THE PRODUCTION OF AROMATICS WITH EXTRACTION BEFORE AROMATIZATION

TECHNICAL FIELD

The present invention relates to the field of processes for the production of aromatic compounds and more particularly aromatic compounds of benzene, toluene and xylene type by catalytic reforming of a hydrocarbon feedstock of naphtha type.

STATE OF THE ART

Generally, the objective of a catalytic reforming unit is to convert naphthenic and paraffinic (n-paraffin and isoparaffin) compounds into aromatic compounds. The main reactions involved are the dehydrogenation of naphthenes and the dehydrocyclization of paraffins to give aromatics, the isomerization of paraffins and of naphthenes Other "side" reactions can also take place, such as the hydrocracking and the hydrogenolysis of paraffins and naphthenes, the hydrodealkylation of alkylaromatics, giving rise to light compounds and lighter aromatics, as well as the formation of coke at the surface of the catalysts.

The feedstocks typically sent to a catalytic reforming unit are rich in paraffinic and naphthenic compounds and relatively poor in aromatic compounds. They are generally naphthas resulting from the distillation of crude oil or natural gas condensates. Other feedstocks may also be available, containing variable contents of aromatics, namely heavy catalytic cracking naphthas, heavy coker naphthas or heavy hydrocracking naphthas, or also steam cracking petrols.

For application in petrochemistry, the performance qualities desired are the yield of aromatics and also the distribution of the aromatics produced. Aromatic compounds are generally processed in an aromatic complex in order to maximize the production of one or more products, generally xylenes and benzene. Toluene and the heavier aromatics can be upgraded in order to form petrol bases or by the production of a mixture of xylenes. The production of C6-C7 aromatic compounds makes it possible in particular to improve the octane number of the petrol and/or makes it possible to increase the supply of benzene, of toluene and of xylenes. In order to maximize the production of C6-C7 aromatic compounds by catalytic reforming, the presence of a specific catalytic system generally comprising a catalytically active metal (generally platinum) and a non-acid zeolite is used.

There exist many known processes which have the aim of maximizing the production of C6-C7 aromatic compounds. For example, Patent Application US2012/0277505 discloses a process for improving the production of benzene and toluene from a feedstock of naphtha type comprising the following stages:

a naphtha stream is sent into a fractionation unit, generating a first stream comprising C7 and lighter hydrocarbons and a second stream comprising heavier hydrocarbons;

the first stream is sent into a first reforming unit, generating a first effluent;

the second stream is sent into a second reforming unit, at a temperature greater than the temperature applied in the first reforming unit, generating a second effluent;

the first effluent and the second effluent are sent into a reformate separation column, thus creating a top stream and a bottom stream;

the top stream is sent into a unit for the purification of aromatic compounds, thus creating a purified stream of aromatics comprising C6 and C7 aromatic compounds, and a raffinate stream, the raffinate stream is recycled in the first reforming unit.

Such a process makes possible an increased production of aromatic hydrocarbons, and in particular of benzene and of toluene, from a naphtha feed stream. More particularly, the stage of recycling the raffinate and the repositioning of the unit for extraction of aromatics, with respect to the two catalytic reforming units located in parallel, makes it possible to generate an increase of 25% in the benzene yields and an increase of approximately 10% in the toluene yields.

The catalysts commonly used for the catalytic reforming of C7 and lighter hydrocarbon cuts generally comprise an active phase based on a metal from Group VIII supported on zeolite. However, such catalysts are very sensitive and can be rapidly deactivated by the formation of carbon-based deposits (or coke) during the reforming reaction. This is because the coke is responsible for the deactivation of the zeolites, in particular by deactivating the active centres (Brønsted acid sites) in different ways: by being more strongly adsorbed there than the reactive molecules, by reacting with them, or also by sterically blocking their access.

One aim of the invention is to provide a process for the production of aromatic compounds, in particular of benzene and toluene, by catalytic reforming of a feedstock of naphtha type, while limiting the deactivation of the zeolitic catalytic reforming catalysts.

The Applicant Company has discovered, surprisingly, that it is possible to limit the deactivation of catalytic reforming catalysts supported on zeolite in a process for extraction of aromatic compounds, in particular benzene and toluene, by a judicious sequence of process stages making it possible to decrease the content of aromatic compounds at the entry of the catalytic reforming. This is because, according to the feedstock of hydrocarbons to be treated, the initial concentration of aromatic compounds can be more or less high, in particular in heavy catalytic cracking naphthas, heavy coker naphthas or heavy hydrocracking naphthas, or also steam cracking petrols, which can generate "side" reactions during the catalytic reforming stage and in particular reactions resulting in the formation of coke.

OBJECTS OF THE INVENTION

The object of the present invention is a process for the production of C6-C7 aromatic compounds from a hydrocarbon feedstock of naphtha type comprising the following stages:

a) the said feedstock is sent into a first fractionation unit in order to obtain an upper stream predominantly comprising C6 and C7 hydrocarbon compounds and a lower stream predominantly comprising C8 to C10 hydrocarbon compounds;

b) the upper stream and a stream predominantly comprising C6-C7 aromatic compounds obtained on conclusion of stage e) are sent into a unit for extraction of the aromatics in order to obtain an aromatic base and a liquid effluent;

c) the liquid effluent is sent into a first catalytic reforming unit in order to obtain a first reformate effluent;

d) the said first reformate effluent is sent into a reformate separation section in order to obtain a first stream predominantly comprising C5 hydrocarbon compounds and a second stream predominantly comprising C6 and C7 aromatic compounds;

e) the second stream predominantly comprising C6 and C7 aromatic compounds is recycled, at least in part, in stage b).

Within the meaning of the invention, the term "a first catalytic reforming unit" means that there is no other reforming unit which would be upstream of this one in the process of the invention: in particular, there is no catalytic reforming unit upstream of the fractionation unit of stage a) or upstream of the unit for extraction of the aromatics of stage b), "upstream" and "downstream" being understood as relating to the general direction of movement of the feedstock in the process and the plant which implements it. The invention thus carries out an extraction of the aromatics before any catalytic reforming operation.

Within the meaning of the invention, the term "predominantly" is understood to mean, throughout the present text, the fact that the stream under consideration comprises, by weight, at least 50% of the components under consideration, in particular at least 80%, in particular at least 90% or 95%, by weight, of the said components. It might also be a matter of all of the components under consideration, apart from the usual impurities.

In stage e), it is possible to recycle, at least in part, the second stream, and in particular all the second stream.

Preferably, the stage of catalytic reforming of the liquid effluent in the first catalytic reforming unit is carried out at a temperature of between 400° C. and 600° C. and a pressure of between 0.1 and 3 MPa, the molar ratio of the hydrogen to the hydrocarbons of the liquid effluent is between 0.8 and 8 mol/mol, and the flow rate by weight of stream to be treated per unit of weight of catalyst and per hour is between 1 and 10 $h^{-1}$.

Advantageously, the lower stream predominantly comprising C8 to C10 hydrocarbon compounds is sent into a second catalytic reforming unit in order to obtain a second reformate effluent.

Preferably, the stage of catalytic reforming of the lower stream in the second catalytic reforming unit is carried out at a temperature of between 400° C. and 600° C. and a pressure of between 0.1 and 3 MPa, the molar ratio of the hydrogen to the hydrocarbons of the lower stream is between 0.8 and 8 mol/mol, and the flow rate by weight of stream to be treated per unit of weight of catalyst and per hour is between 1 and 10 $h^{-1}$.

Advantageously, the said second reformate effluent is sent into the said reformate separation section together with the said first reformate effluent.

Preferably, between stages a) and b), a stage of hydrodesulfurization of the upper stream is carried out in a hydrotreating unit.

Advantageously, a stage of hydrodesulfurization of the lower stream is carried out in a hydrotreating unit located upstream of the second catalytic reforming reactor.

Preferably, the first catalytic reforming unit comprises a catalyst comprising an active phase comprising at least one metal chosen from platinum, zinc or molybdenum, taken alone or as a mixture, a support comprising a zeolite chosen from a zeolite L, a zeolite X, a zeolite Y or a zeolite ZSM-5, and optionally a binder chosen from aluminosilicates, alumina, silica, clays or silicon carbides.

More preferentially, the catalyst comprises an active phase comprising platinum.

More preferentially, the zeolite is a zeolite L.

Advantageously, the binder is silica.

Preferably, the catalyst additionally comprises at least one doping metal chosen from the group formed by gallium, gold, nickel, rhenium, barium, silver, iron, bismuth, indium, yttrium, cerium, dysprosium and ytterbium, taken alone or as a mixture.

Advantageously, the catalyst additionally comprises at least one halogen chosen from chlorine or fluorine.

Preferably, the second catalytic reforming unit comprises a catalyst comprising an active phase comprising at least one metal chosen from nickel, ruthenium, rhodium, palladium, iridium or platinum, at least one promoter chosen from rhenium, tin, germanium, cobalt, nickel, iridium, rhodium or ruthenium, and a support based on alumina, on silica/alumina or on silica.

DETAILED DESCRIPTION OF THE INVENTION

Definitions

Figure 1:
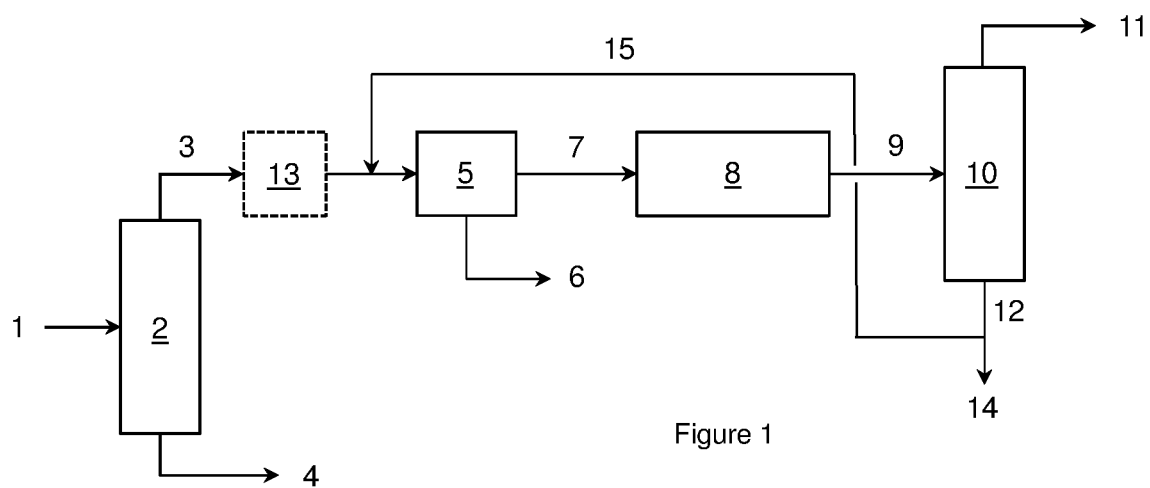
FIG. 1 is a diagrammatic representation of a first embodiment of the process according to the invention.

The unit for extraction of the aromatics denotes a combination of different fractionation units, whether this fractionation is by adsorption, distillation, extractive distillation, liquid/liquid extraction or crystallization, and/or of conversion units, whether this conversion is rearrangement of the aromatics, such as processes for selective or non-selective transalkylation or disproportionation, units for the dealkylation or alkylation of aromatics, or also units for the isomerization of xylenes with or without dealkylation of ethylbenzene. The products of an aromatic complex are mainly petrochemical intermediates known here as "aromatic bases", such as benzene, para-xylene, ortho-xylene, meta-xylene, the xylenes cut, ethylbenzene, the styrene monomer, cumene or linear alkylbenzenes, or also the ingredients for forming petrol bases, such as toluene, or a heavy aromatics cut. If need be, the feedstock entering the aromatic complex can be hydrotreated.

$C_n$ hydrocarbon cut is understood to mean a cut comprising hydrocarbons having n carbon atoms.

$C_{n+}$ cut is understood to mean a cut comprising hydrocarbons having at least n carbon atoms.

$C_{n-}$ cut is understood to mean a cut comprising hydrocarbons having at most n carbon atoms. Finally, hereinbelow the groups of chemical elements are given according to the CAS classification (CRC Handbook of Chemistry and Physics, published by CRC Press, Editor in Chief D. R. Lide, 81st edition, 2000-2001). For example, Group lb according to the CAS classification corresponds to the metals of Column 11 according to the new IUPAC classification.

Description

The present invention relates to a process for the production of aromatic compounds, and in particular benzene and toluene, from a naphtha cut predominantly comprising C6 to C10 hydrocarbons. According to the invention, the process comprises the following stages:

a) the said feedstock is sent into a first fractionation unit in order to obtain an upper stream predominantly comprising C6 and C7 hydrocarbon compounds and a lower stream predominantly comprising C8 to C10 hydrocarbon compounds;

b) the upper stream and a stream predominantly comprising C6-C7 aromatic compounds obtained on conclusion of stage e) are sent into a unit for extraction of the aromatics in order to obtain an aromatic base and a liquid effluent;

c) the liquid effluent is sent into a first catalytic reforming unit in order to obtain a first reformate effluent;

d) the reformate effluent is sent into a reformate separation section in order to obtain a first stream predominantly comprising C5 hydrocarbon compounds and a second stream predominantly comprising C6 and C7 aromatic compounds;

e) the second stream predominantly comprising C6 and C7 aromatic compounds is recycled, at least in part, in stage b).

The catalytic reforming stage in the first reforming unit is carried out under operating conditions adjusted to promote the dehydrocyclization reactions and in order to limit the side reactions. Typically, the pressure used is generally between 0.1 and 3 MPa and the hydrogen/hydrocarbons ($H_2$/HC) molar ratio of the liquid effluent is generally between 1:1 and 10:1, preferably between 2:1 and 6:1. The temperature is generally between 400° C. and 600° C., preferably between 470° C. and 570° C. The flow rate by weight of the stream to be treated per unit of weight of catalyst and per hour (P.P.H.) is generally between 0.1 and 10 $h^{-1}$, preferably between 0.5 and 6 $h^{-1}$.

The catalytic reforming stage c) is carried out in the presence of a catalyst comprising an active phase comprising at least one metal chosen from platinum, zinc or molybdenum, taken alone or as a mixture, and a support comprising a zeolite and optionally a binder. More preferentially, the metal is platinum.

Typically, the catalyst contains an amount of metal of between 0.02% and 2% by weight, preferably between 0.05% and 1.5% by weight and more preferably still between 0.1% and 0.8% by weight, with respect to the total weight of the catalyst.

More particularly, the zeolite is chosen from a zeolite L, a zeolite X, a zeolite Y or a zeolite ZSM-5. More preferentially, the zeolite is a zeolite L.

Preferably, the binder is chosen from aluminosilicates, alumina, silica, clays or silicon carbides, taken alone or in combination. More preferentially, the binder is chosen from silica. The catalyst can also comprise at least one doping metal chosen from the group formed by gallium, gold, nickel, rhenium, barium, silver, iron, bismuth, indium, yttrium and the lanthanides (cerium, dysprosium, ytterbium), taken alone or as a mixture. The content of each dopant metal is, with respect to the total weight of the catalyst, between 0% and 2% by weight, preferably from 0.01% to 1% by weight, preferably from 0.01% to 0.7% by weight.

The catalyst can also comprise at least one halogen used to acidify the alumina support. The halogen content can represent between 0.1% and 15% by weight with respect to the total weight of the catalyst, preferably between 0.2% and 5% with respect to the total weight of the catalyst. Preferably, just one halogen, in particular chlorine or fluorine, is used. When the catalyst comprises just one halogen, which is chlorine or fluorine, the chlorine content is between 0.5% and 2% by weight with respect to the total weight of the catalyst.

The catalyst can also comprise an alkali metal in proportions of the order of 0.1% to 3% by weight with respect to the total weight of the catalyst. Preferably, the alkali metal is potassium.

In the specific embodiment in which a stage of catalytic reforming of the lower stream predominantly comprising C8 to C10 hydrocarbon compounds is carried out in a second dedicated catalytic reforming unit, the said reforming stage is carried out in the presence of a catalyst comprising an active phase comprising at least one metal chosen from nickel, ruthenium, rhodium, palladium, iridium or platinum, and at least one promoter chosen from rhenium, tin, germanium, cobalt, nickel, iridium, rhodium or ruthenium. Preferably, the catalyst comprises an active phase comprising platinum and tin. The amount of metal is between 0.02% and 2% by weight, preferably between 0.05% and 1.5% by weight and more preferably still between 0.1% and 0.8% by weight, with respect to the total weight of the catalyst. Preferably, the catalyst comprises a support based on alumina, on silica/alumina or on silica. Preferably, the support is based on alumina. The alumina(s) of the porous support used in the catalyst are of $\chi$, $\eta$, $\gamma$ or $\delta$ type. Preferably, they are of $\gamma$ or $\delta$ type. More preferably still, they are of $\gamma$ type. The catalytic reforming stage is carried out at a pressure generally of between 0.1 and 3 MPa, preferably between 0.3 and 2.5 MPa, a hydrogen/hydrocarbons $H_2$/HC molar ratio generally of between 0.8 and 8 mol/mol, a temperature generally of between 400° C. and 600° C., preferably between 470° C. and 570° C., and a flow rate by weight of stream to be treated per unit of weight of catalyst and per hour of between 0.1 and 10 $h^{-1}$, preferably between 0.5 and 6 $h^{-1}$.

The invention will now be described in detail on the basis of FIGS. 1 and 2, which exhibit particularly advantageous embodiments. Although these embodiments are provided in order to illustrate the present invention, they are not in any way intended to limit its scope.

With reference to FIG. 1, which non-limitingly illustrates a first embodiment of the process according to the invention, a feedstock 1 of naphtha type comprising C6 to C10 hydrocarbons is sent into a separation column 2 in order to obtain an upper stream 3 predominantly comprising C6 and C7 hydrocarbon compounds and a lower stream 4 predominantly comprising C8 to C10 compounds. The lower stream 4 comprises less than 10% by volume of C7 compounds. The upper stream 3 is optionally sent into a hydrodesulfurization (hydrotreating) unit 13 and then the upper stream, optionally hydrodesulfurized, is sent into a unit for extraction of the aromatics 5 in order to form a purified stream of aromatic compounds 6 and a liquid effluent 7, which is sent into a catalytic reforming unit 8 comprising a catalyst comprising an active phase based on platinum and a support of zeolite type. The operating conditions in the reforming unit 8 are as follows: the temperature is between 400° C. and 600° C., the pressure is between 0.5 and 2.5 MPa, the molar ratio of the hydrogen to the treated liquid effluent is between 0.8 and 8 mol/mol, and the flow rate by weight of stream to be treated per unit of weight of catalyst and per hour (P.P.H.) is between 1 and 10 $h^{-1}$. The reformate effluent 9 is sent into a reformate separation section 10 in order to obtain a first stream 11 predominantly comprising C5 hydrocarbon compounds and a second stream 12 predominantly comprising C6 and C7 aromatic compounds. The stream 12 predominantly comprising C6 and C7 aromatic compounds is subsequently recycled upstream of the unit for extraction of the aromatics 5 via the line 15. A bleed 14 can be provided in order to prevent the accumulation of the said compounds in the process.

Figure 2:
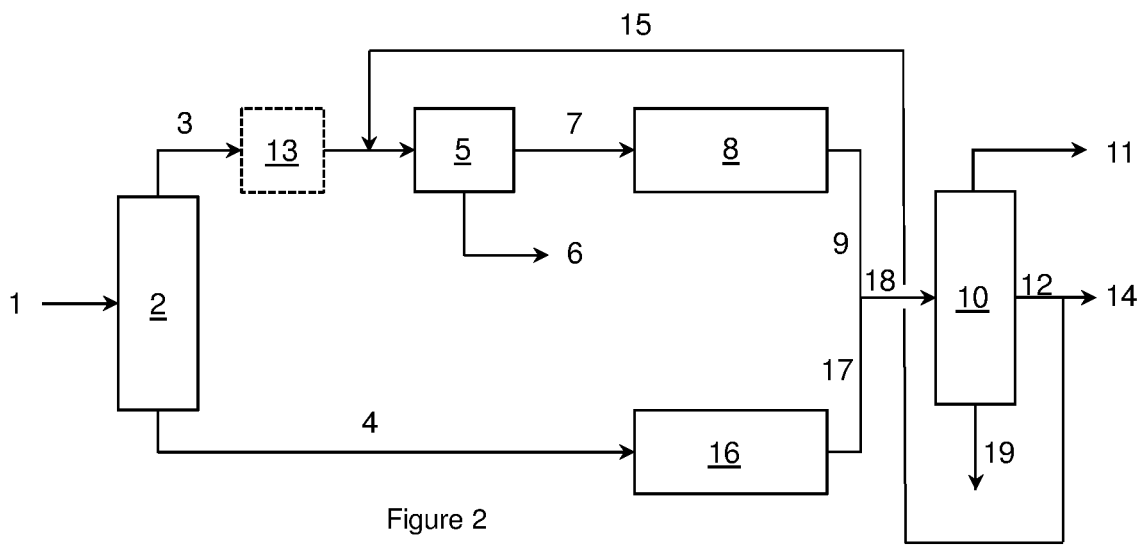
FIG. 2 is a diagrammatic representation of a second embodiment of the process according to the invention.

With reference to FIG. 2, which non-limitingly illustrates a second embodiment of the process according to the invention, a feedstock 1 of naphtha type comprising C6 to C10 hydrocarbons is sent into a separation column 2 in order to obtain an upper stream 3 predominantly comprising C6 and C7 hydrocarbon compounds and a lower stream 4 predominantly comprising C8 to C10 compounds. The lower stream 4 comprises less than 10% by volume of C7 compounds. The upper stream 3 is optionally sent into a hydrodesulfurization (hydrotreating) unit 13 and then the upper stream, optionally hydrodesulfurized, is sent into a unit for extraction of the aromatics 5 in order to form a purified stream of aromatic compounds 6 and a liquid effluent 7, which is sent into a catalytic reforming unit 8 comprising a catalyst comprising an active phase based on platinum and a support of zeolite type. The operating conditions in the reforming unit 8 are as follows: the temperature is between 400° C. and 600° C., the pressure is between 0.3 and 2.5 MPa, the molar ratio of the hydrogen to the hydrocarbons of the liquid effluent is between 0.8 and 8 mol/mol, and the flow rate by weight of stream to be treated per unit of weight of catalyst and per hour (P.P.H.) is between 1 and 10 $h^{-1}$. The lower stream 4 is optionally sent into a hydrodesulfurization unit (not represented in FIG. 2) and then the lower stream, optionally hydrodesulfurized, is sent into a second catalytic reforming unit 16, comprising a bifunctional catalyst comprising an active phase based on platinum and on tin (Pt—Sn) supported on alumina. The operating conditions in the second reforming unit 16 are as follows: the temperature is between 400° C. and 600° C., the pressure is between 0.5 and 2.5 MPa, the molar ratio of the hydrogen to the hydrocarbons of the lower stream (optionally hydrodesulfurized) is between 0.8 and 8 mol/mol, and the flow rate by weight of the stream to be treated per unit of weight of catalyst and per hour (P.P.H.) is between 1 and 10 $h^{-1}$. The first reformate 9 resulting from the first reforming unit 8 and the second reformate 17 resulting from the second reforming unit 16 are subsequently combined together to form a reformate stream 18 which is subsequently sent into a separation section 10 (not described in detail in the figure) in order to obtain a first stream 11 predominantly comprising C5 hydrocarbon compounds, a second stream 12 predominantly comprising C6 and C7 aromatic compounds, and a third stream 19 predominantly comprising C8+ hydrocarbon compounds. The second stream 12 predominantly comprising C6 and C7 aromatic compounds is subsequently recycled upstream of the unit for extraction of the aromatics 5 via the line 15. A bleed 14 can be provided in order to prevent the accumulation of the said compounds in the process.

EXAMPLES

The example which follows compares two processing schemes: a scheme not in accordance with the invention, comprising a unit for extraction of the aromatics which is located downstream of the catalytic reforming unit (cf. FIG. 3), and a scheme according to the invention, comprising a unit for extraction of the aromatics which is located upstream of the catalytic reforming unit (cf. FIG. 1 or FIG. 2).

For each scheme according to the prior art and according to the invention, the catalytic reforming units and the units for extraction of the aromatics are identical.

In all the cases, the naphtha feedstock under consideration is as follows:
- density at 15° C.=0.758 $kg/dm^3$;
- distribution by weight: 49.55% by weight of paraffins, 2.7% by weight of naphthenes and 47.7% by weight of aromatics, with respect to the total weight of the feedstock.

Example 1

Reforming Process According to the Prior Art

Figure 3:
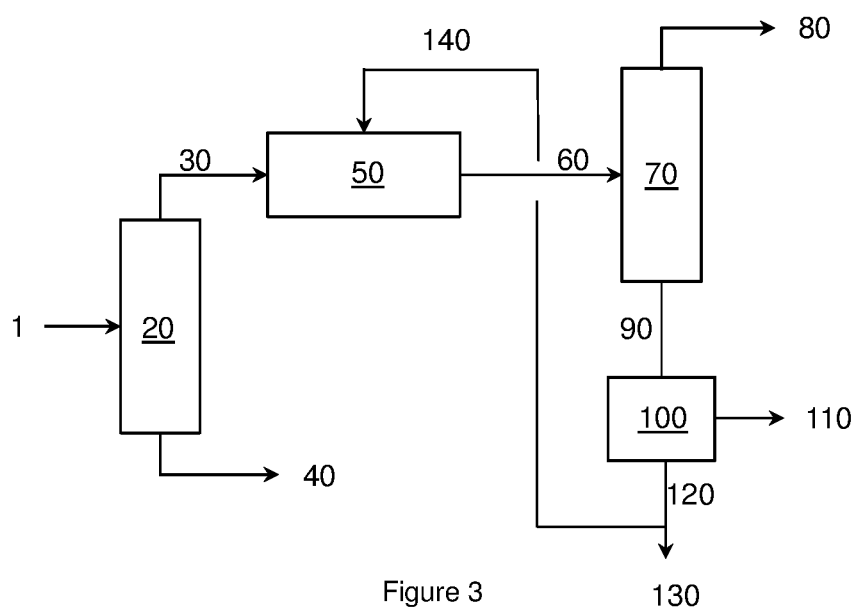
FIG. 3 is a diagrammatic representation of the process according to the prior art.

The scheme of the process according to the prior art corresponds to FIG. 3

In the scheme according to the prior art, the naphtha feedstock 1 comprising C6 to C10 hydrocarbons is sent into a separation column 20 in order to obtain an upper stream 30 predominantly comprising C6 and C7 hydrocarbon compounds and a lower stream 40 predominantly comprising C8 to C10 compounds. The lower stream 40 comprises less than 10% by volume of C7 compounds. The upper stream 30 is sent into a catalytic reforming unit 50 comprising five reactors in series, comprising a catalyst comprising an active phase based on platinum and a support of zeolite L type.

The operating conditions below represent the operating conditions used in a pilot unit for the first reforming unit 50:
- Temperature=470° C.;
- Pressure=0.39 MPa;
- P.P.H.=1 $h^{-1}$;
- $H_2/HC$=1.5.

The catalyst used in the first catalytic reforming unit is a catalyst based on platinum (0.3% by weight of Pt with respect to the total weight of the catalyst) supported on a zeolite L.

The reformate 60 resulting from the first reforming unit 50 is sent into a reformate separation column 70 in order to obtain a top stream 80 predominantly comprising C5 hydrocarbon compounds and a bottom stream 90 predominantly comprising C6 and C7 aromatic compounds. The bottom stream 90 is subsequently sent into a unit for extraction of the aromatics 100, in order to form a purified stream of aromatic compounds 110 and a liquid effluent 120, a part of which is recycled to the catalytic reforming unit 50 via the line 140. The other part of the stream 120 is discharged from the process via the line 130.

In the process according to the prior art (FIG. 3), the unit for extraction of the aromatics 100 is located downstream of the catalytic reforming unit 50 (in the direction of the circulation of the fluids) and not upstream of the catalytic reforming unit, as is the case in the context of the process according to the invention.

Example 2

Reforming Process According to the Invention

The scheme of the process according to the invention of Example 2 corresponds to that described in FIG. 1.

The operating conditions below represent the operating conditions used in a pilot unit for the first reforming unit 5, comprising five reforming reactors in series:
- Temperature=470° C.;
- Pressure=0.39 MPa;
- P.P.H.=1 $h^1$;
- $H_2/HC$=1.5.

The catalyst used in the first catalytic reforming unit is a catalyst based on platinum (0.3% by weight of Pt with respect to the total weight of the catalyst) supported on a zeolite L.

Example 3

Evaluation of the Content of Coke

In the context of Example 1, not in accordance with the invention, and of Example 2, in accordance with the invention, the formation of coke obtained on the catalyst used in the first catalytic reforming unit is simulated in accelerated fashion on a pilot unit under isothermal conditions, in comparison with a process carried out on the industrial scale. The test is carried out over a limited period of time (in the present example, a period of time of 15 days). This test thus simulates an accelerated ageing of the catalyst.

The test was carried out by operating at a temperature of 470° C., a pressure of 0.39 MPa and a flow rate by weight of stream to be treated in the first reforming unit of 1 h$^{-1}$ for a period of time of 15 days. The content of coke measured on the catalyst after testing for 15 days is represented in Table 1 below.

TABLE 1

Evaluation of the content of coke

| | According to the prior art (FIG. 3) | According to the invention (FIG. 1) |
|---|---|---|
| % by weight of coke | 2.0% | 1.3% |

The content of coke formed on the catalyst of the first reforming unit in the context of the process according to the invention (1.3% by weight with respect to the total weight of the catalyst) is less than that formed on the catalyst of the first reforming unit in the context of the process according to the prior art (2.0% by weight of coke with respect to the total weight of the catalyst). The decrease in the formation of coke on the catalyst in the context of the process according to the invention is due mainly to the very specific positioning of the unit for extraction of the aromatics upstream of the catalytic reforming unit, which makes it possible to extract the aromatic compounds already present initially in the naphtha feedstock and thus makes it possible to reduce the formation of coke on the zeolitic reforming catalysts. This is because the coke is responsible for the deactivation of the zeolites, in particular by deactivating the active centres (Brønsted acid sites) in different ways: by being more strongly adsorbed there than the reactive molecules, by reacting with them, or also by sterically blocking their access.

The invention claimed is:

1. A process for the production of C6-C7 aromatic compounds from a hydrocarbon feedstock of naphtha type comprising the following stages:
    a) the feedstock (1) is sent into a first fractionation unit (2) to obtain an upper stream (3) predominantly comprising C6 and C7 hydrocarbon compounds and a lower stream (4) predominantly comprising C8 to C10 hydrocarbon compounds;
    b) the upper stream (3) and a stream (12) predominantly comprising C6-C7 aromatic compounds obtained at the end of a stage e) are sent into a unit for extraction of aromatics (5) to obtain an aromatic base (6) and a liquid effluent (7), wherein the upper stream (3) has not undergone catalytic reforming prior to being sent into the unit for extraction of aromatics;
    c) the liquid effluent (7) is sent into a first catalytic reforming unit (8) to obtain a first reformate effluent (9);
    d) the first reformate effluent (9) is sent into a reformate separation section (10) to obtain a first stream (11) predominantly comprising C5 hydrocarbon compounds and a second stream (12) predominantly comprising C6 and C7 aromatic compounds;
    e) the second stream (12) predominantly comprising C6 and C7 aromatic compounds is recycled, at least in part, in stage b).

2. The process according to claim 1, in which the catalytic reforming of the liquid effluent in the first catalytic reforming unit is carried out at a temperature of 400° C. to 600° C. and a pressure of 0.1 to 3 MPa, the molar ratio of the hydrogen to the hydrocarbons of the liquid effluent is 0.8 to 8 mol/mol, and the flow rate by weight of stream to be treated per unit of weight of catalyst and per hour is 1 to 10 h$^{-1}$.

3. The process according to claim 1, in which the lower stream (4) predominantly comprising C8 to C10 hydrocarbon compounds is sent into a second catalytic reforming unit (16) to obtain a second reformate effluent (17).

4. The process according to claim 3, in which the catalytic reforming of the lower stream (4) in the second catalytic reforming unit is carried out at a temperature of 400° C. to 600° C. and a pressure of 0.1 to 3 MPa, the molar ratio of the hydrogen to the hydrocarbons of the lower stream is 0.8 to 8 mol/mol, and the flow rate by weight of stream to be treated per unit of weight of catalyst and per hour is 0.1 to 10 h$^{-1}$.

5. The process according to claim 3, in which the second reformate effluent (17) is sent into the reformate separation section (10) together with the first reformate effluent (9).

6. The process according to claim 1, in which, between stages a) and b), a stage of hydrodesulfurization of the upper stream (3) is carried out in a hydrotreating unit (13).

7. The process according to claim 3, in which a stage of hydrodesulfurization of the lower stream (4) is carried out in a hydrotreating unit (13) located upstream of the second catalytic reforming reactor (16).

8. The process according to claim 1, in which the first catalytic reforming unit comprises a catalyst comprising an active phase comprising at least one metal, which is platinum, zinc or molybdenum, or a mixture thereof, a support comprising a zeolite, which is a zeolite L, a zeolite X, a zeolite Y or a zeolite ZSM-5, and optionally a binder, which is an aluminosilicate, alumina, silica, clay or silicon carbide.

9. The process according to claim 8, in which the catalyst comprises an active phase comprising platinum.

10. The process according to claim 8, in which the zeolite is a zeolite L.

11. The process according to claim 8, in which the binder is silica.

12. The process according to claim 8, in which the catalyst additionally comprises at least one doping metal, which is gallium, gold, nickel, rhenium, barium, silver, iron, bismuth, indium, yttrium, cerium, dysprosium or ytterbium, or a mixture thereof.

13. The process according to claim 8, in which the catalyst additionally comprises at least one halogen, which is chlorine or fluorine.

14. The process according to claim 3, in which the second catalytic reforming unit comprises a catalyst comprising an active phase comprising at least one metal, which is nickel, ruthenium, rhodium, palladium, iridium or platinum, at least one promoter, which is rhenium, tin, germanium, cobalt, nickel, iridium, rhodium or ruthenium, and a support based on alumina, on silica/alumina or on silica.

15. A process for the production of C6-C7 aromatic compounds from a hydrocarbon feedstock of naphtha type comprising the following stages:
   a) the feedstock (1) is sent into a first fractionation unit (2) to obtain an upper stream (3) predominantly comprising C6 and C7 hydrocarbon compounds and a lower stream (4) predominantly comprising C8 to C10 hydrocarbon compounds;
   b) the upper stream (3) and a stream (12) predominantly comprising C6-C7 aromatic compounds obtained at the end of a stage e) are sent into a unit for extraction of aromatics (5) to obtain an aromatic base (6) and a liquid effluent (7);
   c) the liquid effluent (7) is sent into a first catalytic reforming unit (8) to obtain a first reformate effluent (9);
   d) the first reformate effluent (9) is sent into a reformate separation section (10) to obtain a first stream (11) predominantly comprising C5 hydrocarbon compounds and a second stream (12) predominantly comprising C6 and C7 aromatic compounds;
   e) the second stream (12) predominantly comprising C6 and C7 aromatic compounds is recycled, at least in part, in stage b);
   wherein in addition
   between stages a) and b), a stage of hydrodesulfurization of the upper stream (3) is carried out in a hydrotreating unit (13);
   or
   the lower stream (4) predominantly comprising C8 to C10 hydrocarbon compounds is sent into a second catalytic reforming unit (16) to obtain a second reformate effluent (17), and a stage of hydrodesulfurization of the lower stream (4) is carried out in a hydrotreating unit (13) located upstream of the second catalytic reforming reactor (16).

16. The process according to claim 15, in which, between stages a) and b), a stage of hydrodesulfurization of the upper stream (3) is carried out in a hydrotreating unit (13).

17. The process according to claim 15, in which the lower stream (4) predominantly comprising C8 to C10 hydrocarbon compounds is sent into a second catalytic reforming unit (16) to obtain a second reformate effluent (17), and a stage of hydrodesulfurization of the lower stream (4) is carried out in a hydrotreating unit (13) located upstream of the second catalytic reforming reactor (16).

* * * * *